(12) United States Patent
Tehran et al.

(10) Patent No.: US 11,171,424 B2
(45) Date of Patent: Nov. 9, 2021

(54) SOLUTION FOR BEAM TILTING ASSOCIATED WITH DUAL-POLARIZED MM-WAVE ANTENNAS IN 5G TERMINALS

(71) Applicant: Samsung Electronics Co., Ltd., Suwon-si (KR)

(72) Inventors: Hamid Reza Memar Zadeh Tehran, Frisco, TX (US); Sung-Chul Park, Seoul (KR); Gary Xu, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/820,389

(22) Filed: Mar. 16, 2020

(65) Prior Publication Data
US 2021/0057826 A1    Feb. 25, 2021

Related U.S. Application Data

(60) Provisional application No. 62/889,619, filed on Aug. 21, 2019, provisional application No. 62/923,792, filed on Oct. 21, 2019.

(51) Int. Cl.
| | | |
|---|---|---|
| *H01Q 15/14* | (2006.01) | |
| *H04B 1/38* | (2015.01) | |
| *H04M 1/02* | (2006.01) | |
| *H04B 1/3827* | (2015.01) | |
| *H01Q 1/24* | (2006.01) | |

(52) U.S. Cl.
CPC ............ *H01Q 15/14* (2013.01); *H01Q 1/243* (2013.01); *H04B 1/3833* (2013.01); *H04M 1/0202* (2013.01)

(58) Field of Classification Search
CPC ...... H01Q 15/14; H01Q 15/24; H01Q 21/245; H01Q 25/00; H01Q 1/243; H01Q 9/0457; H04B 1/3833; H04B 1/40; H04M 1/0202; H04M 1/026
See application file for complete search history.

(56) References Cited

U.S. PATENT DOCUMENTS

| | | |
|---|---|---|
| 5,982,334 A | 11/1999 | Manasson et al. |
| 6,020,858 A | 2/2000 | Sagisaka |
| (Continued) | | |

FOREIGN PATENT DOCUMENTS

KR    10-2019-0090292 A    8/2019

OTHER PUBLICATIONS

Zrnic et al., "A draft report on Issues and challenges for polarimetric measurement of weather with an agile-beam phased array radar", National Oceanic and Atmospheric Administration/National Severe Storms Laboratory report, 2012, 119 pages.
(Continued)

*Primary Examiner* — Quochien B Vuong

(57) ABSTRACT

A user equipment (UE) and a method of operating the UE. The UE includes a front surface, a rear surface, a transceiver, and a plurality of electromagnetic strips. The front surface includes a display and the rear surface includes a cover. The transceiver is between the display and the cover and is configured to transmit signals supporting vertical polarization and horizontal polarization. The plurality of electromagnetic strips are proximate to the cover and oriented to selectively tilt one of the horizontal polarization or the vertical polarization of the signals.

20 Claims, 13 Drawing Sheets

(56) References Cited

U.S. PATENT DOCUMENTS

| | | | |
|---|---|---|---|
| 7,075,494 B2* | 7/2006 | Sergey | H01Q 21/0037 |
| | | | 343/700 MS |
| 8,970,444 B2* | 3/2015 | Gustafsson | H01Q 1/243 |
| | | | 343/839 |
| 9,806,419 B2* | 10/2017 | Uno | H01Q 21/0075 |
| 9,838,060 B2* | 12/2017 | McCaughey | H04M 1/0202 |
| 10,327,348 B2* | 6/2019 | Wright | H04M 1/0202 |
| 10,797,394 B2* | 10/2020 | Dalmia | H01Q 21/065 |
| 10,886,977 B2* | 1/2021 | Rodriguez-Cano | |
| | | | H04B 7/0617 |
| 2006/0152422 A1 | 7/2006 | Kubba et al. | |
| 2017/0025767 A1 | 1/2017 | Elsallal et al. | |
| 2017/0082907 A1 | 3/2017 | Park et al. | |
| 2019/0229413 A1 | 7/2019 | Jong et al. | |

OTHER PUBLICATIONS

Truong et al., "Hybrid Beamforming for dual-polarized antenna", 2019 IEEE Wireless Communications and Networking Conference (WCNC), Apr. 2019, 6 pages.

Mccormack, "Non-Radiative Calibration of Active Antenna Arrays", Doctoral Thesis, Department of Electronic Engineering, National University of Ireland, Feb. 2010, 353 pages.

Suzuki et al., "Iteration-Free Design of Waveguide Slot Array With Cavities", IEEE Transactions on Antennas and Propagation, vol. 58, No. 12, Dec. 2010, pp. 3891-3897.

International Search Report of the International Searching Authority dated Nov. 25, 2020 in connection with International Application No. PCT/KR2020/010609, 3 pages.

\* cited by examiner

SOLUTION FOR BEAM TILTING ASSOCIATED WITH DUAL-POLARIZED MM-WAVE ANTENNAS IN 5G TERMINALS

CROSS-REFERENCE TO RELATED APPLICATION AND CLAIM OF PRIORITY

This application claims priority under 35 U.S.C. § 119(e) to U.S. Provisional Patent Application No. 62/889,619 filed on Aug. 21, 2019 and U.S. Provisional Patent Application No. 62/923,792 filed on Oct. 21, 2019, the disclosures of which are incorporated herein by reference in their entireties.

TECHNICAL FIELD

The present disclosure relates generally to a user equipment (UE) that includes a dual-polarized 5G module. More particularly, the present disclosure relates to a UE that establishes radiation at millimeter wave (mmWave) frequencies while supporting orthogonal polarizations.

BACKGROUND

The next generation of telecommunication infrastructure is realized through the implementation of 5G networks. The 5G networks require new developments for both the backbone infrastructure and user equipments (UEs), particularly hand-held devices such as smartphones, wearable devices, etc. Refurbishing existing networks such as 4G/LTE networks can facilitate the realization of 5G network for designated frequencies at sub-6 GHz only because of the almost identical form factor. However, the associated radiofrequency (RF) transceivers for sub-6 GHz (e.g., Massive MIMO) are different. Practical solutions for implementations in UEs are available for the sub-6 GHz band of 5G networks.

However, the implementation of UEs operating at 5G mmWave frequencies faces challenges. For example, UEs operating at two separate frequencies, such as 28 GHz and 39 GHz, face challenges including reduced efficiency, propagation loss, and foliage and environmental interaction. Various embodiments of the present disclosure recognize the complications of incorporating 5G mmWave hardware in existing UEs. These complications include the presence of additional hardware for seamless communications within 4G/LTE networks, limited physical dimensions, and relatively high interaction with non-metallic and metallic supports at mmWave bands compared to the sub-6 GHz alternatives. In particular, the interaction with non-metallic and metallic supports at mmWave bands results in challenges including radiation pattern distortion, beam tilting, and gain loss.

SUMMARY

The present disclosure relates to a structure that corrects the horizontal polarization of a radiated beam.

In one embodiment, a user equipment (UE) includes a front surface, a rear surface, a transceiver, and a plurality of electromagnetic strips. The front surface includes a display and the rear surface includes a cover. The transceiver is between the display and the cover and is configured to transmit signals supporting vertical polarization and horizontal polarization. The plurality of electromagnetic strips are proximate to the cover and oriented to selectively tilt one of the horizontal polarization or the vertical polarization of the signals.

In another embodiment, a method of operating a UE includes transceiver of the UE, signals supporting vertical polarization and horizontal polarization through a plurality of electromagnetic strips positioned proximate to a cover of the UE, the plurality of electromagnetic strips oriented to selectively tilt one of the horizontal polarization or the vertical polarization of the signals. The UE comprises a front surface including a display and a rear surface including the cover. The transceiver is provided between the cover and the display.

In this disclosure, the terms antenna, antenna module, antenna array, beam, and beam steering are frequently used. An antenna module may include one or more arrays. One antenna array may include one or more antenna elements. Each antenna element may be able to provide one or more polarizations, for example vertical polarization, horizontal polarization or both vertical and horizontal polarizations at or around the same time. Vertical and horizontal polarizations at or around the same time can be refracted to an orthogonally polarized antenna. An antenna module radiates the accepted energy in a particular direction with a gain concentration. The radiation of energy in the particular direction is conceptually known as a beam. A beam may be a radiation pattern from one or more antenna elements or one or more antenna arrays.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

FIGS. 1 through 10, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands and sub-6 GHz bands, e.g., 3.5 GHz bands, so as to accomplish higher data rates. To decrease propagation loss of the radio waves and increase the transmission coverage, the beamforming, Massive MIMO, full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
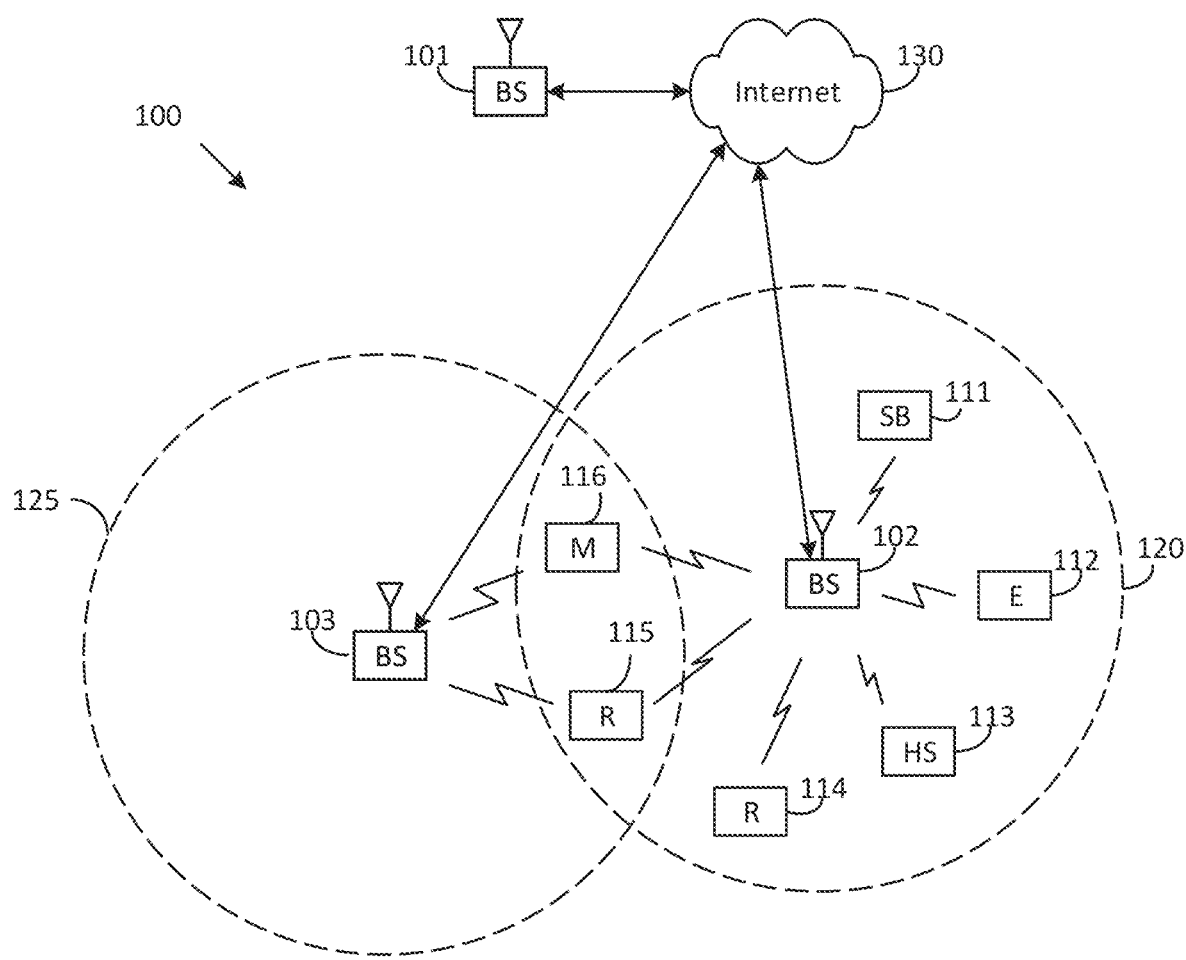
FIG. 1 illustrates an example wireless network according to various embodiments of the present disclosure.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in the present disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the present disclosure to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. The gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
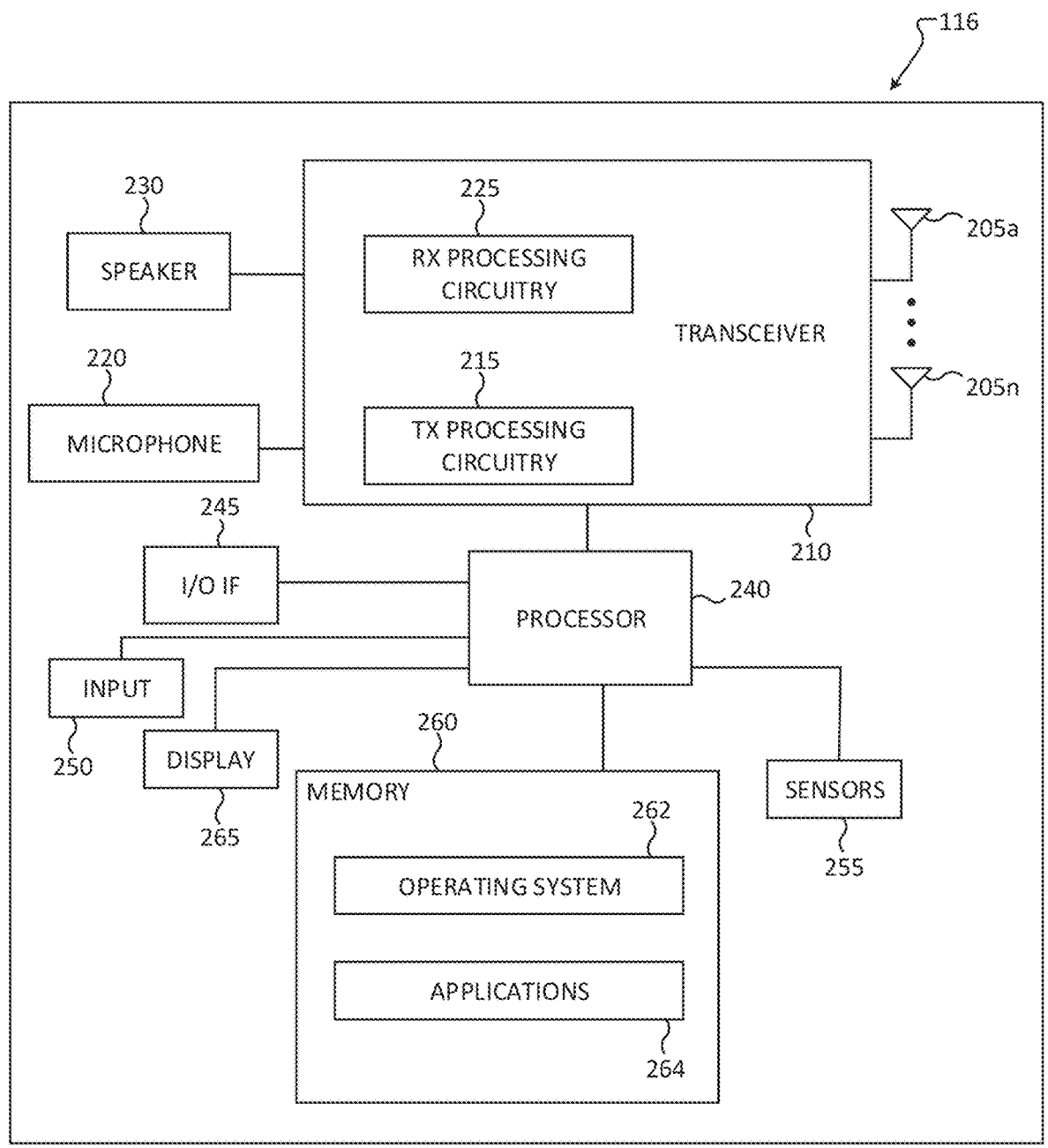
FIG. 2 illustrates an example user equipment (UE) according to various embodiments of the present disclosure.

FIG. 2 illustrates an example UE 116 according to various embodiments of the present disclosure. The embodiment of the UE 116 illustrated in FIG. 2 is for illustration only, and the UEs 111-115 of FIG. 1 can have the same or similar configuration. However, UEs come in a wide variety of configurations, and FIG. 2 does not limit the scope of the present disclosure to any particular implementation of a UE.

The UE 116 includes one or more transceivers 210, a microphone 220, a speaker 230, a processor 240, an input/output (I/O) interface 245, an input 250, one or more sensors 255, a display 265, and a memory 260. The memory 260 includes an operating system (OS) program 262 and one or more applications 264.

The transceiver 210 includes transmit (TX) processing circuitry 215 to modulate signals, receive (RX) processing circuitry 225 to demodulate signals, and an antenna array 205 including antennas to send and receive signals. The antenna array 205 receives an incoming signal transmitted by a gNB of the wireless network 100 of FIG. 1. The transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted by the antenna array 205.

The processor 240 can include one or more processors or other processing devices and execute the OS program 262 stored in the memory 260 in order to control the overall operation of the UE 116. For example, the processor 240 can control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 can execute other processes and programs resident in the memory 260, such as operations for transmitting dual polarized beams as described in embodiments of the present disclosure. The processor 240 can move data into or out of the memory 260 as part of an executing process. In some embodiments, the processor 240 is configured to execute the applications 264 based on the OS program 262 or in response to signals received from gNBs or an operator. The processor 240 is also coupled to the I/O interface 245, which provides the UE 116 with the ability to connect to other devices such as laptop computers and handheld computers. The I/O interface 245 is the communication path between these accessories and the processor 240.

The processor 240 is also coupled to the input 250 (e.g., keypad, touchscreen, button etc.) and the display 265. The operator of the UE 116 can use the input 250 to enter data into the UE 116. The display 265 can be a liquid crystal display or other display capable of rendering text and/or at least limited graphics, such as from web sites.

The memory 260 is coupled to the processor 240. The memory 260 can include at least one of a random-access memory (RAM), Flash memory, or other read-only memory (ROM).

As described in more detail below, the UE 116 can perform transmission and reception of signals using dual polarized beams. Although FIG. 2 illustrates one example of UE 116, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs) and one or more graphics processing units (GPUs). Although FIG. 2 illustrates the UE 116 as a mobile telephone or smartphone, UEs can be configured to operate as other types of mobile or stationary devices.

Various embodiments of the present disclosure recognize challenges faced by the UE 116 in 5G communication systems. As described herein, horizontal polarization from the transceiver 210 can be distorted due, in part, to the physical proximity of electromagnetic (e.g., metallic) and non-metallic fixtures within the UE 116. The distortion can tilt the horizontal polarization from the transceiver 210, causing misalignment with the vertical polarization. Various embodiments of the present disclosure recognize this misalignment and recognize that many solutions to correct the horizontal polarization inadvertently adjust the vertical polarization as well. Therefore, various embodiments of the present disclosure provide a structure that aligns the horizontal and vertical polarization by correcting the horizontal polarization of a radiated beam while maintaining the vertical polarization.

Figure 3A:
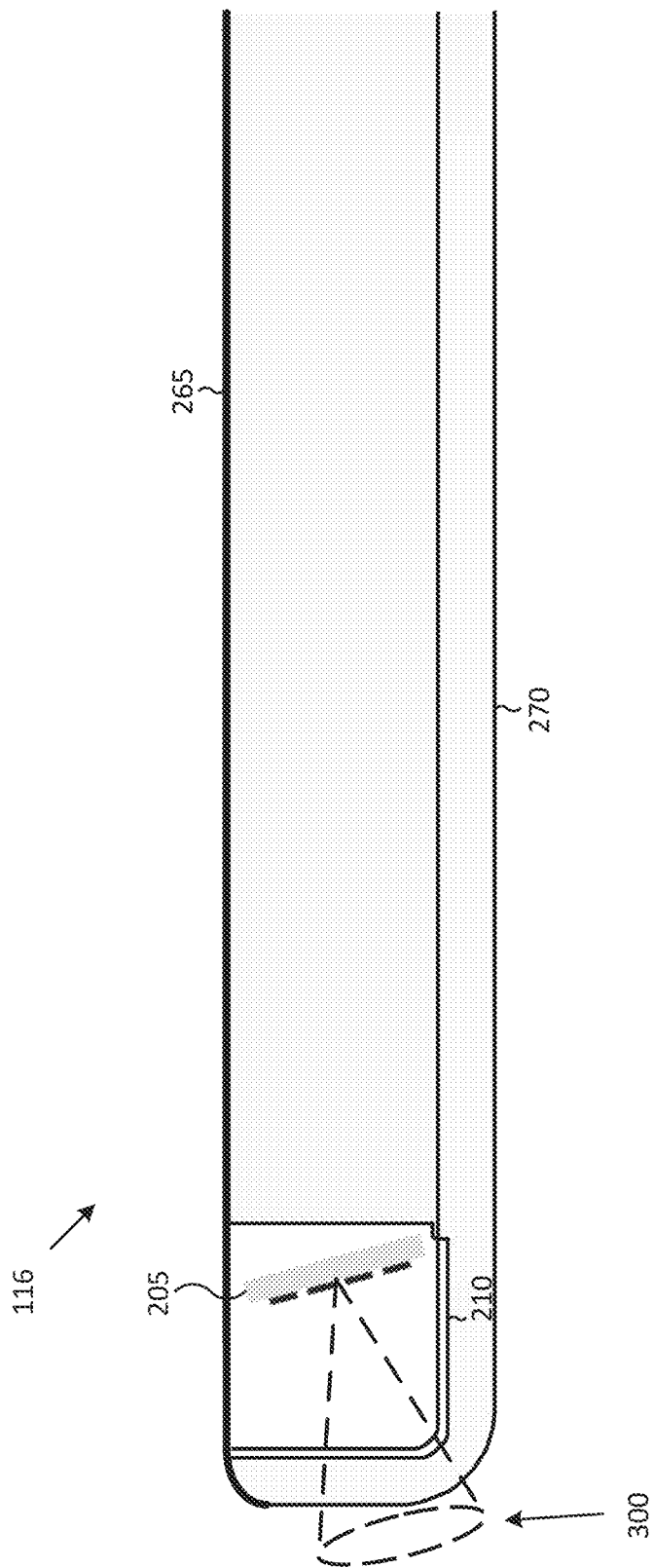
FIGS. 3A and 3B illustrate cut-away views of a UE according to various embodiments of the present disclosure.
Figure 3B:
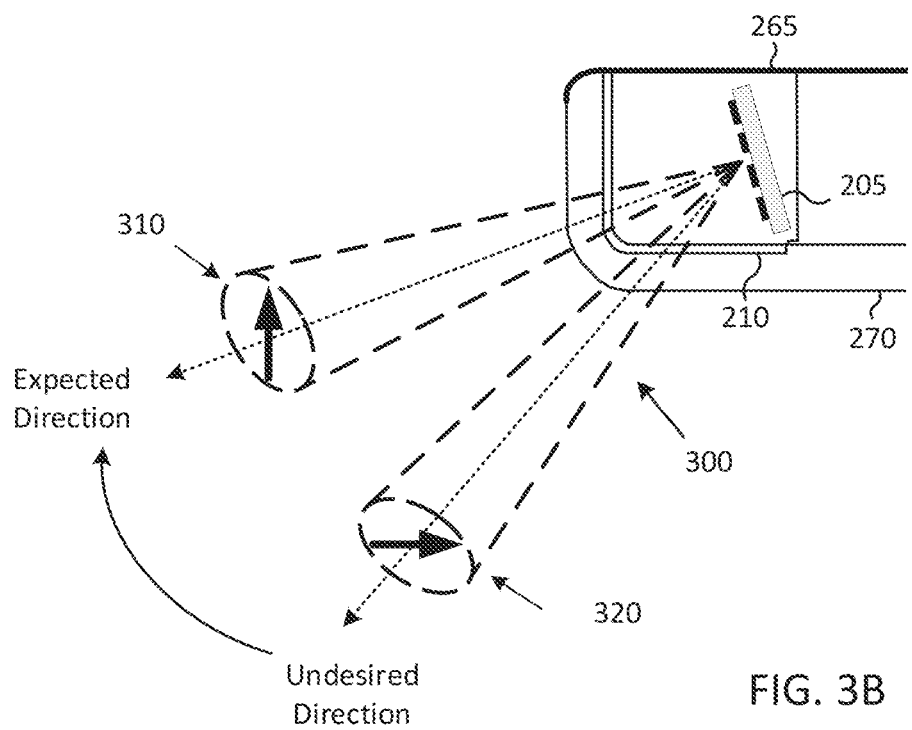

For example, FIGS. 3A and 3B illustrate cut-away views of a UE according to various embodiments of the present disclosure. The embodiment of the UE 116 shown in FIGS. 3A and 3B is for illustration only and should not be construed as limiting. The UE 116 illustrated in FIGS. 3A and 3B can be the UE 116 illustrated in FIGS. 1 and 2.

As shown in FIG. 3A, the UE 116 includes the display 265 and a cover 270. Together, the display 265 and the cover 270 form an exterior shell of the UE 116. The components of the UE 116, including the TX processing circuitry 215, RX processing circuitry 225, processor 240, and memory 260 can be disposed between the display 265 and the cover 270.

As shown in FIGS. 3A and 3B, the transceiver 210 is disposed between the display 265 and the cover 270. The transceiver 210 is provided at an edge of the UE 116 in order to transmit and receive signals. The transceiver 210 includes the antenna array 205 that have a radiation pattern 300 with a preset orientation based on the orientation of the antenna array 205 within the UE 116.

The radiation pattern 300 supports a pair of orthogonal polarizations in both the vertical direction 310 and the horizontal direction 320. The vertical polarization 310 exhibits desirable performance toward the expected direction while the horizontal polarization 320 does not. For example, as shown in FIG. 3B, horizontal polarization 320 is tilted toward an undesired direction, causing the vertical polarization 310 and the horizontal polarization 320 to not be aligned. Various embodiments of the present disclosure recognize that the misalignment between the vertical polarization 310 and the horizontal polarization 320 can present challenges resulting from this polarization selectivity. In particular, embodiments of the present disclosure recognize that the misalignment can hinder the mmWave radiation from the antenna array 205, resulting in radiation pattern distortion, beam tilting, and gain loss of the UE 116.

Accordingly, various embodiments of the present disclosure enable alignment of the vertical polarization 310 and the horizontal polarization 320 of a radiation pattern 300 for antenna array 205. In particular, embodiments of the present disclosure enable a correction of the horizontal polarization 320, without altering the vertical polarization 310, to align the vertical polarization 310 and the horizontal polarization 320 of the radiation pattern 300 to prevent beam tilting and radiation pattern distortion.

Figure 4A:
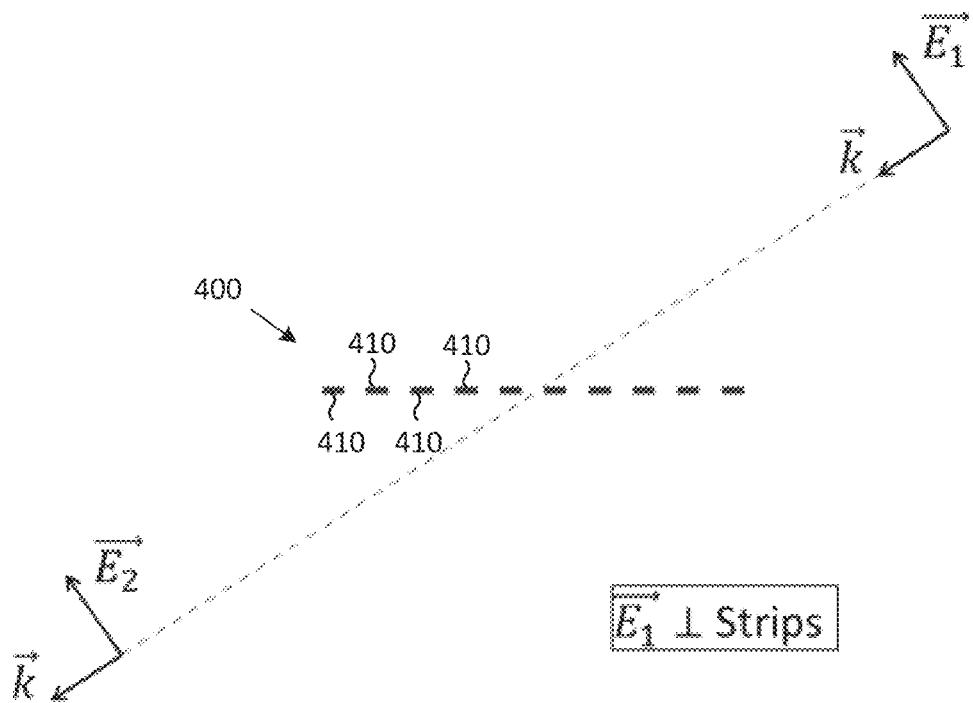
FIGS. 4A and 4B illustrate a semi-metallic screen according to various embodiments of the present disclosure.
Figure 4B:
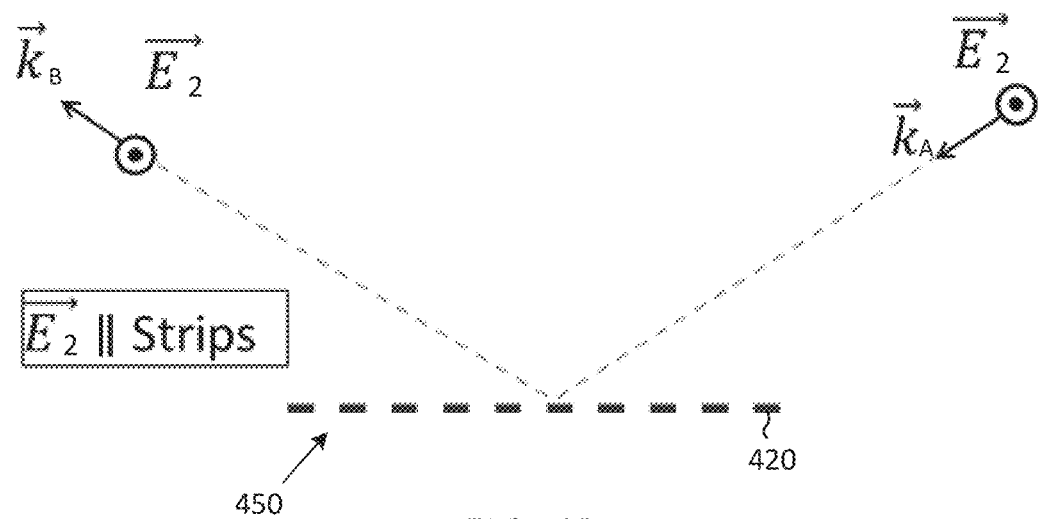

FIGS. 4A and 4B illustrate semi-metallic screens according to various embodiments of the present disclosure. The embodiment of the semi-metallic screen is for illustration only and should not be construed as limiting. For example, various features can be added to the semi-metallic screen or omitted from the semi-metallic screen in keeping with the present disclosure.

FIG. 4A illustrates a semi-metallic screen 400 according to various embodiments of the present disclosure. The semi-metallic screen 400 includes a plurality of electromagnetic strips 410. The plurality of electromagnetic strips 410 are described in greater detail below, such as in the descriptions of FIGS. 5A, 5B, 7A, and 7B. In various embodiments, the plurality of electromagnetic strips 410 can be provided in the UE 116, such as inside the cover 270 or between the cover 270 and the display 265. The electromagnetic strips 410 described herein may be formed using any electromagnetic or electrically conductive material, for example, metals, such as, copper, silver, aluminum, iron, alloys, etc; ceramics; polymers; etc.

As illustrated in FIG. 4A, the electromagnetic strips 410 of the semi-metallic screen 400 are arranged perpendicular (E1) to the incidence wave polarization (k). When the electromagnetic strips 410 are arranged perpendicular to the incidence wave polarization, the electric field does not induce a current on the electromagnetic strips 410. Therefore, the incidence waves pass, or travel, through the semi-metallic screen 400. Accordingly, the semi-metallic screen 400 is effectively invisible as it relates to the incidence waves.

FIG. 4B illustrates a semi-metallic screen 450 according to various embodiments of the present disclosure. The semi-metallic screen 450 includes a plurality of electromagnetic strips 420. The plurality of electromagnetic strips 420 can be the same as or identical to the plurality of electromagnetic strips 410. The plurality of electromagnetic strips 420 are described in greater detail below, such as in the descriptions of FIGS. 5A, 5B, 7A, and 7B. In various embodiments, the plurality of electromagnetic strips 420 can be provided in the UE 116, such as inside the cover 270 or between the cover 270 and the display 265.

As illustrated in FIG. 4B, the electromagnetic strips 420 of the semi-metallic screen 450 are arranged parallel (E2) to the incidence wave polarization ($k_A$). When the electromagnetic strips 420 are arranged parallel to the incidence wave polarization, the electric field induces a current on the electromagnetic strips 420. Therefore, the incidence waves reflect off of the semi-metallic screen 450 as shown by the reflected incidence wave polarization $k_B$. In other words, the electromagnetic strips 420 can act as a mirror for the polarization.

Figure 5A:
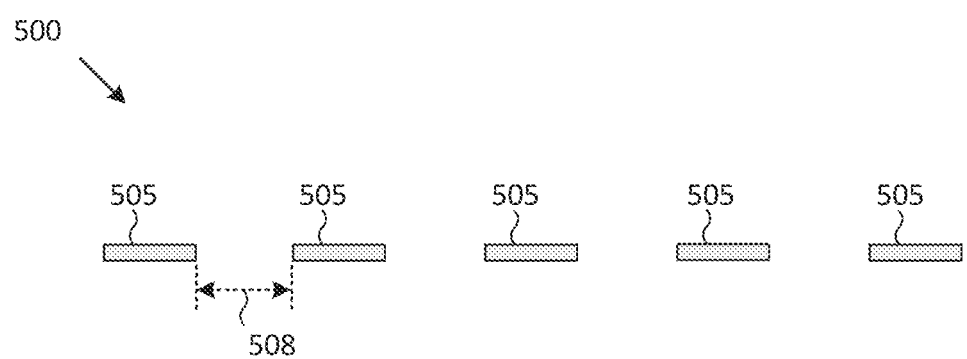
FIGS. 5A-5F illustrate examples of semi-metallic screens according to various embodiments of the present disclosure.
Figure 5B:
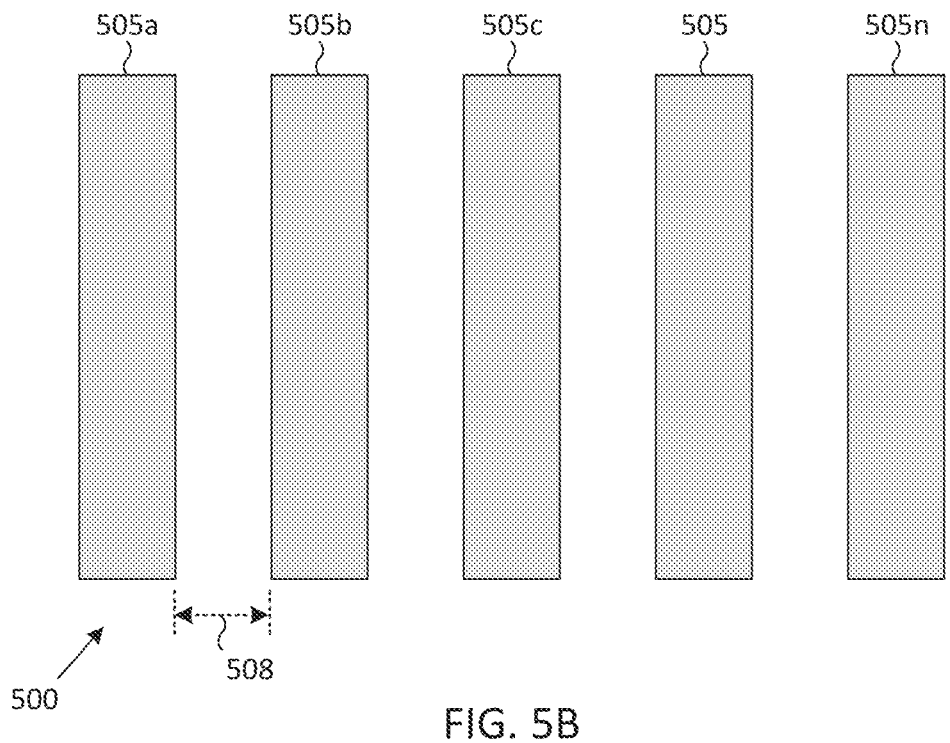

FIGS. 5A and 5B illustrate a semi-metallic screen according to various embodiments of the present disclosure. The embodiment of the semi-metallic screen 500 is for illustration only and should not be construed as limiting. For example, various features can be added to the semi-metallic screen 500 or omitted from the semi-metallic screen 500 in keeping with the present disclosure. FIG. 5A illustrates a side view of the semi-metallic screen 500 according to various embodiments of the present disclosure. FIG. 5B illustrates a top view of the semi-metallic screen 500 according to various embodiments of the present disclosure. The semi-metallic screen 500 can be the semi-metallic screen 400 or the semi-metallic screen 450 illustrated in FIGS. 4A and 4B, respectively.

The semi-metallic screen 500 includes a plurality of electromagnetic strips 505. The plurality of electromagnetic strips 505 can be the electromagnetic strips 410 or the electromagnetic strips 420 illustrated in FIGS. 4A and 4B, respectively. In some embodiments, the plurality of electromagnetic strips 505 are provided in a parallel or substantially parallel manner. For example, as shown in FIG. 5B, each of the electromagnetic strips 505a-505n are provided parallel to each adjoining electromagnetic strip. Electromagnetic strip 505a is provided parallel to electromagnetic strip 505b. Likewise, electromagnetic strip 505b is provided parallel to both electromagnetic strip 505a and electromagnetic strip 505c.

Between each of the electromagnetic strips 505 is a space 508. For example, the electromagnetic strip 505a and the electromagnetic strip 505b are separated by a space 508. In some embodiments, the space 508 can be approximately the same width as each of the electromagnetic strips. In other embodiments, the space 508 can have a width that is greater than or less than the width of the electromagnetic strips 505.

Although illustrated in FIGS. 5A and 5B as including electromagnetic strips 505 that are substantially parallel, the semi-metallic screen 500 can be provided in various embodiments. For example, FIGS. 5C-5F illustrate various embodiments of the electromagnetic strips 505.

Figure 5C:
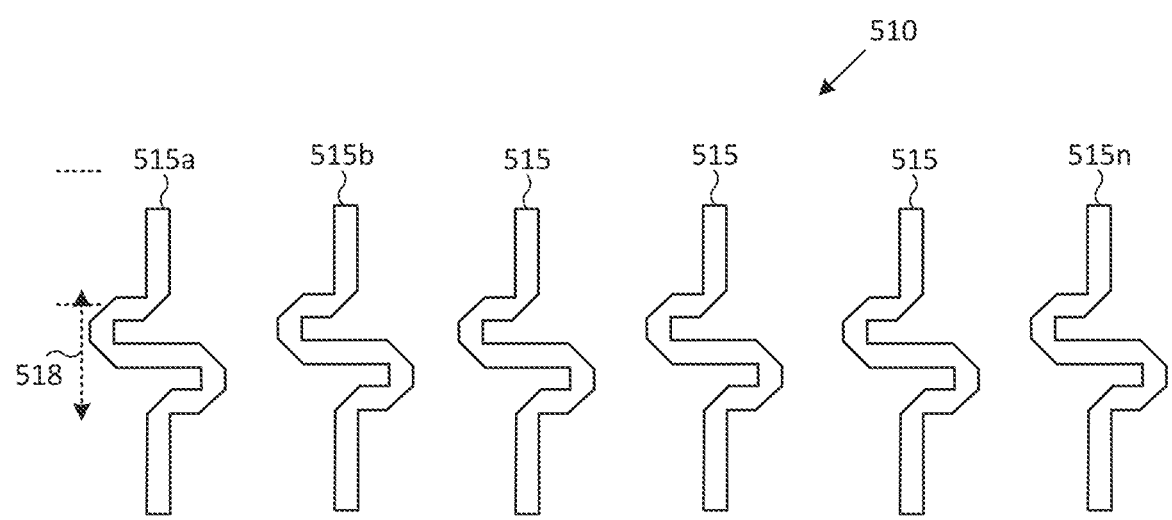

FIG. 5C illustrates an alternative semi-metallic screen according to various embodiments of the present disclosure. The embodiment of the semi-metallic screen 510 is for illustration only and should not be construed as limiting. For example, various features can be added to the semi-metallic screen 510 or omitted from the semi-metallic screen 510 in keeping with the present disclosure. The semi-metallic screen 510 includes a plurality of electromagnetic strips 515a-515n. The semi-metallic screen 510 can be the semi-metallic screen 500 and the plurality of electromagnetic strips 515a-515n can be the electromagnetic strips 410 or the electromagnetic strips 420 illustrated in FIGS. 4A and 4B, respectively.

As shown in FIG. 5C, each of the plurality of electromagnetic strips 515a-515n includes a curved portion 518. In some embodiments, the curved portion 518 can be described as meandering or winding. The curved portion 518 can more precisely tilt the polarization into a desired direction.

Figure 5D:
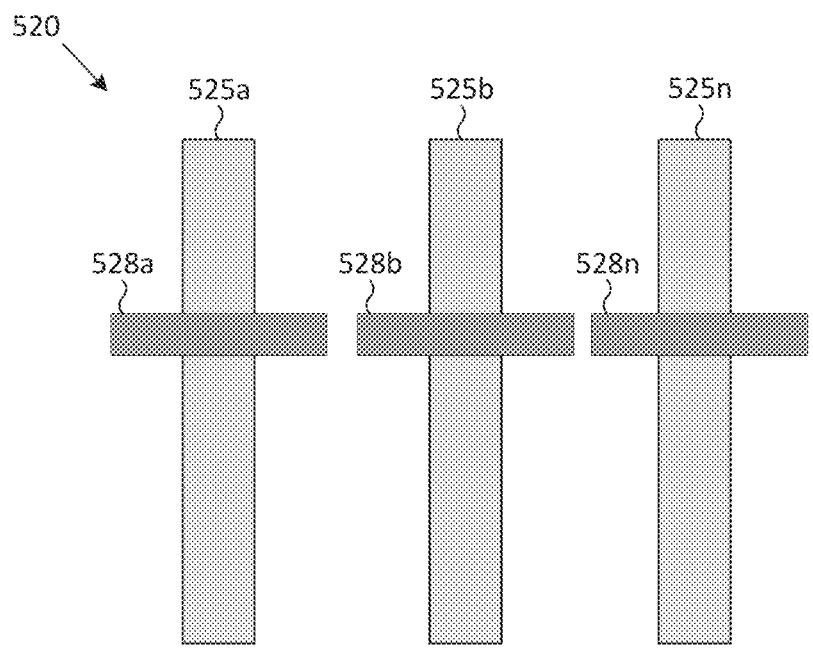

FIG. 5D illustrates a semi-metallic screen according to various embodiments of the present disclosure. The embodiment of the semi-metallic screen 520 is for illustration only and should not be construed as limiting. For example, various features can be added to the semi-metallic screen 520 or omitted from the semi-metallic screen 520 in keeping with the present disclosure. FIG. 5D illustrates a top view of a semi-metallic screen 520. The semi-metallic screen 520 can be the semi-metallic screen 500 and the electromagnetic strips 525 can be the electromagnetic strips 410 or the electromagnetic strips 420 illustrated in FIGS. 4A and 4B, respectively. Although FIG. 5D illustrates three electromagnetic strips 525a, 525b, and 505n, this embodiments should not be construed as limiting. The semi-metallic screen 520 illustrated in FIG. 5D can include as many or as few electromagnetic strips 525 as necessary.

Each of the electromagnetic strips 525 illustrated in FIG. 5D includes a switch 528. For example, the electromagnetic strip 525a includes a switch 528a, the electromagnetic strip 525b includes a switch 528b, and the electromagnetic strip 525n includes a switch 528n. The plurality of switches 528a-528n are configured to extend a range of the transceiver 210.

Figure 5E:
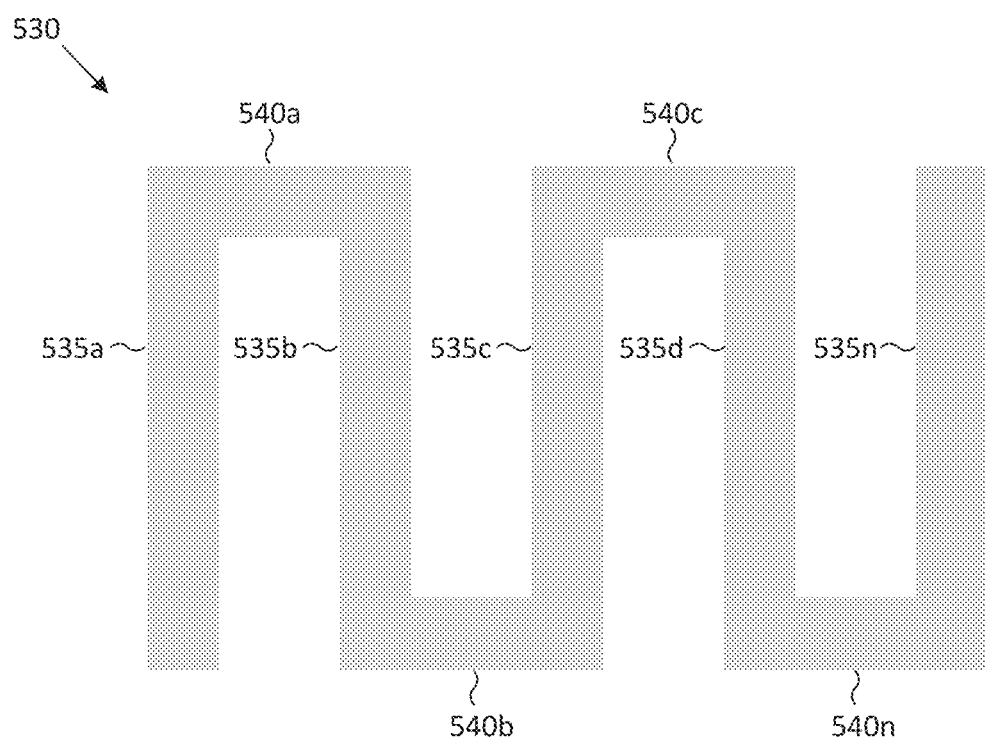

FIG. 5E illustrates a semi-metallic screen according to various embodiments of the present disclosure. The embodiment of the semi-metallic screen 530 is for illustration only and should not be construed as limiting. For example, various features can be added to the semi-metallic screen 530 or omitted from the semi-metallic screen 530 in keeping with the present disclosure. FIG. 5E illustrates a top view of a semi-metallic screen 530. The semi-metallic screen 530 can be the semi-metallic screen 500.

The semi-metallic screen 530 includes a plurality of electromagnetic strips 535a-535n. The plurality of electromagnetic strips 535a-535n can be the electromagnetic strips 410 or the electromagnetic strips 420 illustrated in FIGS. 4A and 4B, respectively. The semi-metallic screen 530 further includes connection portions 540 between each of the plurality of electromagnetic strips 535a-535n. The connection portions 540 can be electromagnetic and provided such that the electromagnetic strips is connected to another of the electromagnetic strips. For example, by the connection portion 540a, the electromagnetic strip 535a is connected to the electromagnetic strip 535b. Likewise, by the connection portion 540b, the electromagnetic strip 535b is connected to the electromagnetic strip 535c, by the connection portion 540c, the electromagnetic strip 535c is connected to the electromagnetic strip 535d, and by the connection portion 540n, the electromagnetic strip 535d is connected to the electromagnetic strip 535n.

Although illustrated in FIG. 5E as including five electromagnetic strips 535a-535n and four connection portions 540a-540n, this embodiment should not be construed as limiting and various embodiments are possible. The semi-metallic screen 530 can include more or fewer than five electromagnetic strips and four connection portions according to various embodiments of the present disclosure.

Figure 5F:
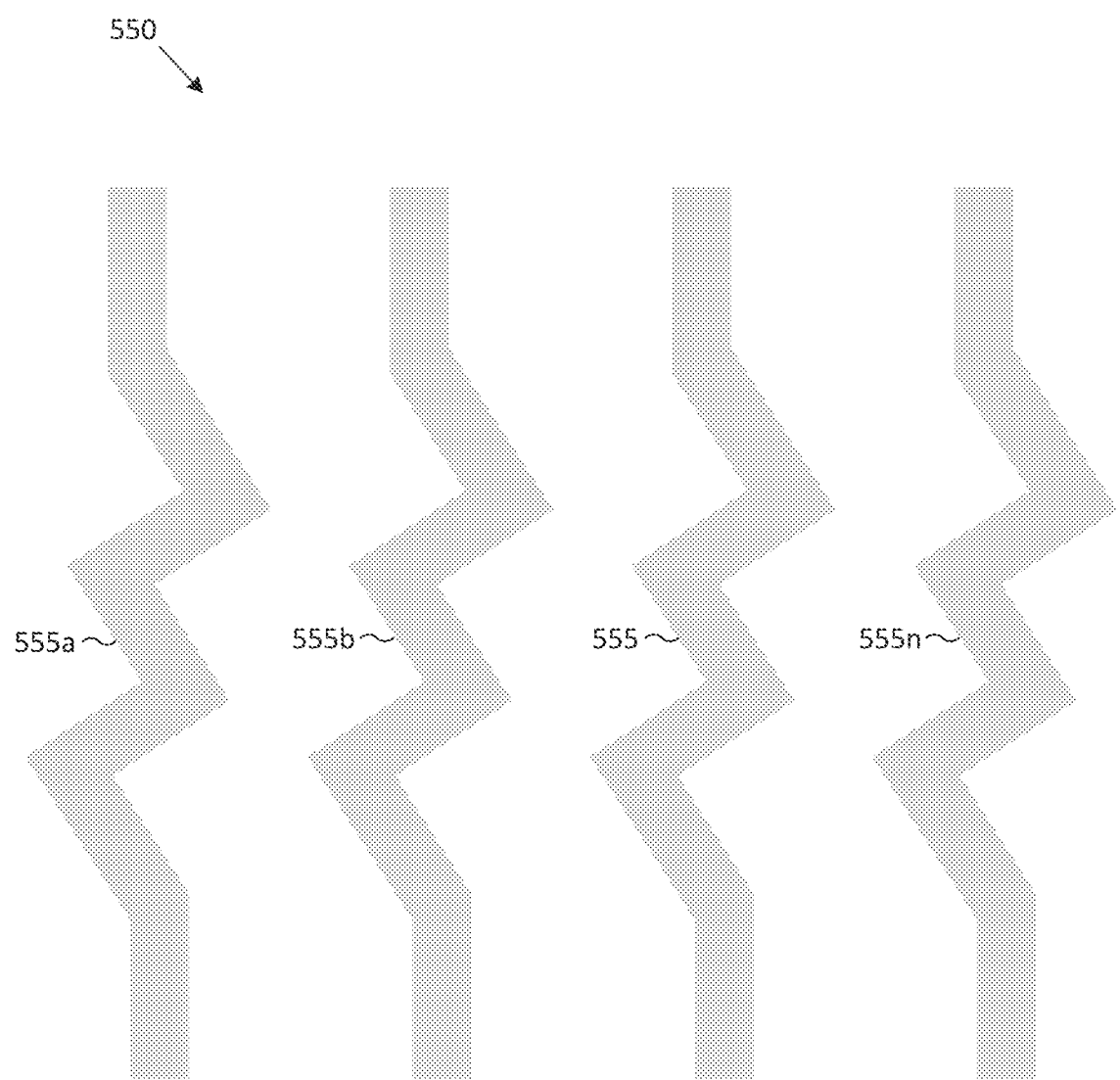

FIG. 5F illustrates a semi-metallic screen according to various embodiments of the present disclosure. The embodiment of the semi-metallic screen 550 is for illustration only and should not be construed as limiting. For example, various features can be added to the semi-metallic screen 550 or omitted from the semi-metallic screen 550 in keeping with the present disclosure. FIG. 5F illustrates a top view of a semi-metallic screen 550. The semi-metallic screen 550 can be the semi-metallic screen 500.

The semi-metallic screen 550 includes a plurality of electromagnetic strips 555a-555n. The plurality of electromagnetic strips 555a-555n can be the electromagnetic strips 410 or the electromagnetic strips 420 illustrated in FIGS. 4A and 4B, respectively. The plurality of electromagnetic strips 555 include a zig zag pattern where portions of each electromagnetic strip 555 are provided at a diagonal offset relative to other portions of the electromagnetic strip 555. The diagonal offset can be measured as any degree between parallel and perpendicular without departing from the present disclosure.

Although described herein as separate embodiments, various combinations can be made between the embodiments described in FIGS. 5A-5F. For example, the switches 528a can be included on any of the electromagnetic strips 505, 515, 535, or 555. As another example, the connection portions 540 can be included on any of the electromagnetic strips 505, 515, 525, or 555. As yet another example, the electromagnetic strips 515 including the meandering portion 518 can include a switch 528, a connection portion 540, or be provided in the zig zag or offset pattern illustrated in FIG. 5F.

Figure 6A:
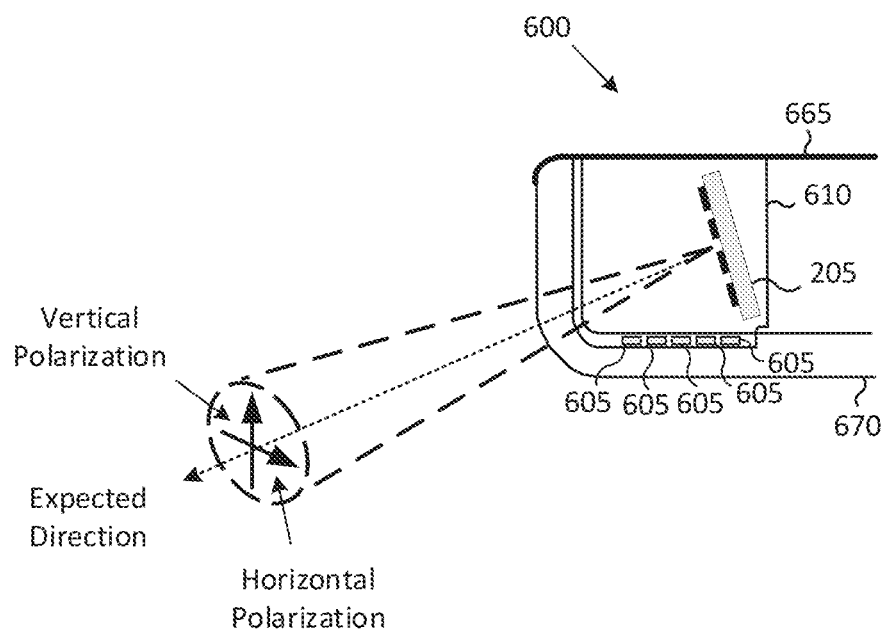
FIGS. 6A and 6B illustrate cut-away views of a UE including a semi-metallic screen according to various embodiments of the present disclosure.
Figure 6B:
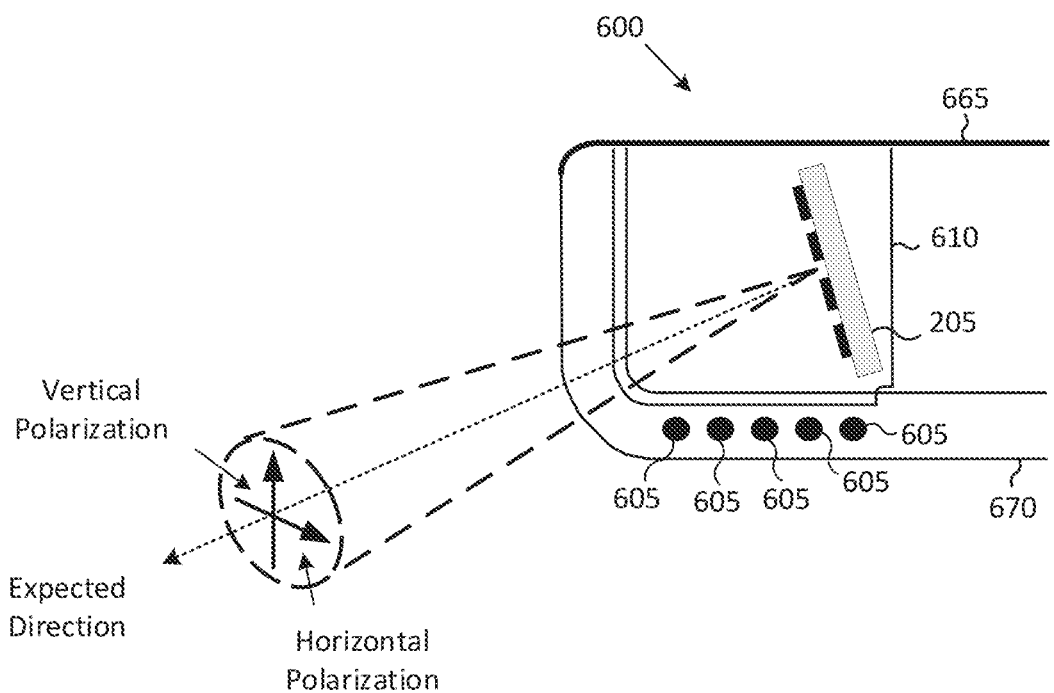

FIGS. 6A and 6B illustrate cut-away views of a UE including a semi-metallic screen according to various embodiments of the present disclosure. The embodiments of the UE shown in FIGS. 6A and 6B are for illustration only and should not be construed as limiting. As described herein, the UE 116 illustrated in FIGS. 6A and 6B can align the horizontal polarization and vertical polarization by correcting the horizontal polarization of a radiated beam while maintaining the vertical polarization.

The UE 600 illustrated in FIGS. 6A and 6B can be a modified version of the UE 116 illustrated in FIGS. 1 and 2. For example, the UE 600 illustrated in FIGS. 6A and 6B includes a transceiver 610 that includes the antenna array 205, a display 665, and a cover 670. In various embodiments, the transceiver 610 can be the transceiver 210, the display 665 can be the display 265, and the cover 670 can be the cover 270. Further, the UE 600 can include additional elements such as the transmit (TX) processing circuitry 215, a microphone 220, receive (RX) processing circuitry 225, speaker 230, processor 240, input/output (I/O) interface 245, input 250, and one or more sensors 255 as described in FIG. 2.

The UE 600 further includes a plurality of electromagnetic strips 605. The plurality of electromagnetic strips 605 can be the electromagnetic strips 505. The plurality of electromagnetic strips 605 can form a semi-metallic screen, such as the semi-metallic screen 400, 450, or 500. The plurality of electromagnetic strips 605 are provided in a manner that the semi-metallic screen is provided parallel to the horizontal wave polarization transmitted from the transceiver 610 and perpendicular to the vertical wave polarization transmitted from the transceiver 610. This configuration tilts the horizontal polarization toward the direction of the vertical polarization, without significantly altering the vertical polarization. As a result, the horizontal polarization is aligned with the vertical polarization. By aligning the horizontal polarization with the vertical polarization, both polarizations are transmitted in an expected direction.

Although the plurality of electromagnetic strips 605 are described herein as provided to tilt the horizontal polarization, this embodiment is for illustration only and should not be construed as limiting. Various embodiments are possible without departing from the scope of the present disclosure. For example, the plurality of electromagnetic strips 605 can be provided perpendicular to the horizontal wave polarization transmitted from the transceiver 610 and parallel to the vertical wave polarization transmitted from the transceiver 610. This configuration tilts the vertical polarization toward the direction of the horizontal polarization, without significantly altering the horizontal polarization. As a result, the vertical polarization can be aligned with the horizontal polarization.

The plurality of electromagnetic strips 605 can be provided in different configurations within the UE 600. In some embodiments, as shown in FIG. 6A, the plurality of electromagnetic strips 605 are provided within the transceiver 610. In other embodiments, as shown in FIG. 6B, the plurality of electromagnetic strips 605 are provided outside of the transceiver 610 and embedded, or built into, the cover 670.

The plurality of electromagnetic strips 605 can be provided in the UE 600 in various forms. For example, as shown in FIG. 6A, the plurality of electromagnetic strips 605 can be provided in a rectangular form. As shown in FIG. 6B, the plurality of electromagnetic strips 605 can be provided in a circular form. Although the rectangular plurality of electromagnetic strips 605 are shown within the transceiver 610 and the circular plurality of electromagnetic strips 605 are shown embedded in the cover 670, these embodiments are shown for illustration only and should not be construed as limiting. Rectangular plurality of electromagnetic strips 605 can be provided embedded in the cover 670 and circular plurality of electromagnetic strips 605 can be provided in the transceiver 610 without departing from the scope of the present disclosure.

Figure 7:
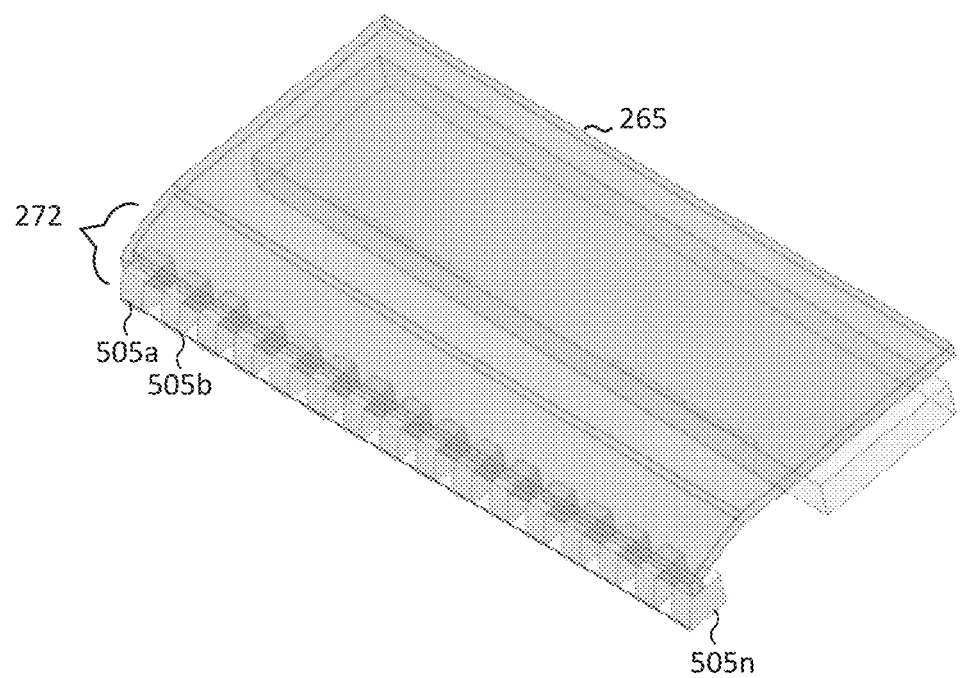
FIG. 7 illustrates a UE according to various embodiments of the present disclosure.

FIG. 7 illustrates a UE according to various embodiments of the present disclosure. FIG. 7 illustrates the UE 116 including the display 265 and the cover 270. As described herein, the display 265 can be provided on the front surface. The display 265 can be a touch screen that receives inputs from a user. As also described herein, the cover 270 can be provided on a rear surface. In some embodiments, the cover 270 can additionally surround the sides of the UE 116. The cover 270 can include a curvature 272 corresponding to where the side surfaces of the UE 116 transition to the rear surface of the UE 116.

As illustrated in FIG. 7, the UE 116 includes the electromagnetic strips 505. More particularly, the UE 116 includes the electromagnetic strips 505 formed with a curved portion that corresponds to the curvature 272 of the cover 270. In some embodiments, the electromagnetic strips 505 can be embedded in the cover 270 as illustrated in FIG. 6B. In these embodiments, the electromagnetic strips 505 replace portions of the cover 270. In other embodiments, the electromagnetic strips 505 are added to the cover 270 and do not replace any portions of the cover 270, as illustrated in FIG. 6A.

Figure 8A:
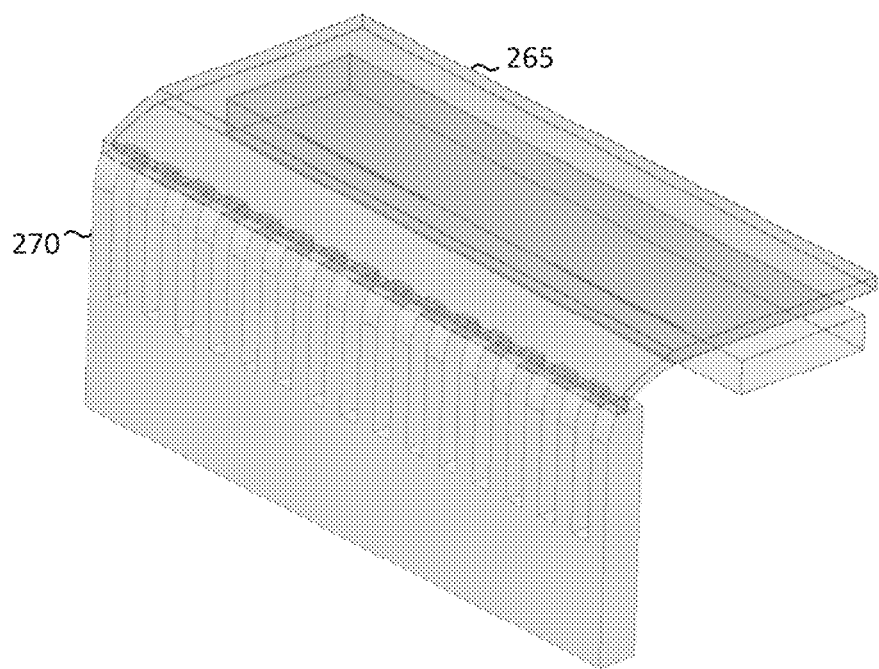
FIGS. 8A and 8B illustrate a UE according to various embodiments of the present disclosure.
Figure 8B:
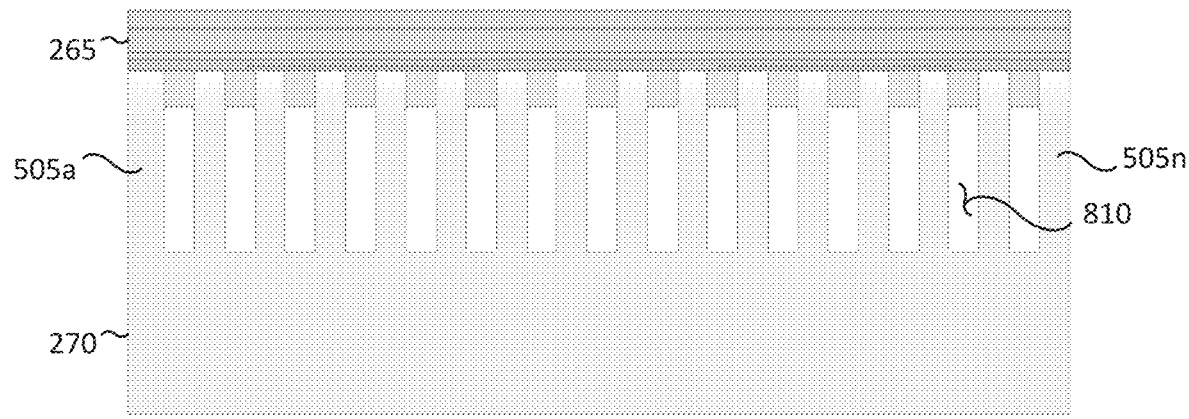

FIGS. 8A and 8B illustrate a UE according to various embodiments of the present disclosure. FIG. 8A illustrates the UE 116 including the display 265 and the cover 270. As described herein, the display 265 can be provided on the front surface. The display 265 can be a touch screen that receives inputs from a user. As also described herein, the cover 270 can be provided on a rear surface. In some embodiments, the cover 270 can additionally surround the sides of the UE 116.

FIG. 8B illustrates the UE 116 with the addition of the electromagnetic strips 505. As shown in FIG. 8B, the electromagnetic strips 505 extend into the cover 270 further than as shown in FIG. 8A. Various embodiments of the present disclosure can provide electromagnetic strips 505 that extend more or less into the cover 270 depending on the particular transmission requirements of the UE 116.

FIG. 8B further illustrates spaces 810 in the cover 270 between each of the electromagnetic strips 505. Although illustrated as including spaces 810, various embodiments are possible. For example, the electromagnetic strips 505 provided in the UE 116 can be the electromagnetic strips 515, 525, 535, or 555.

Figure 9A:
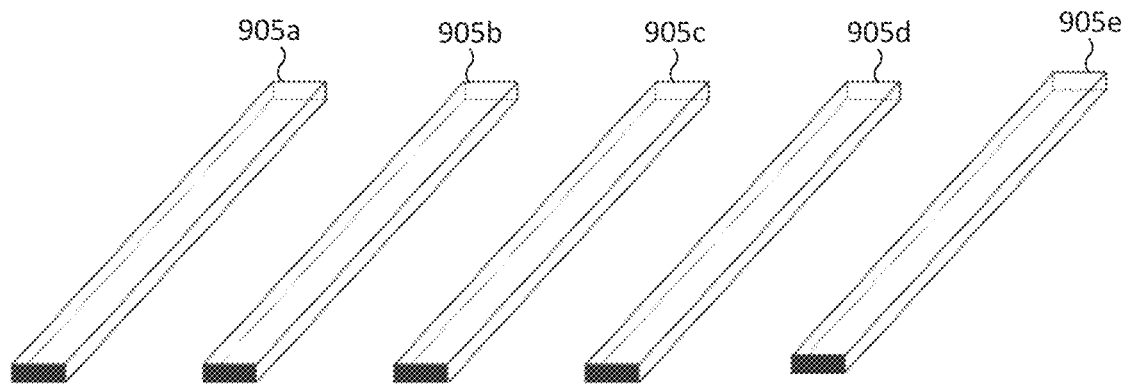
FIGS. 9A and 9B illustrate a plurality of electromagnetic strips according to various embodiments of the present disclosure.
Figure 9B:
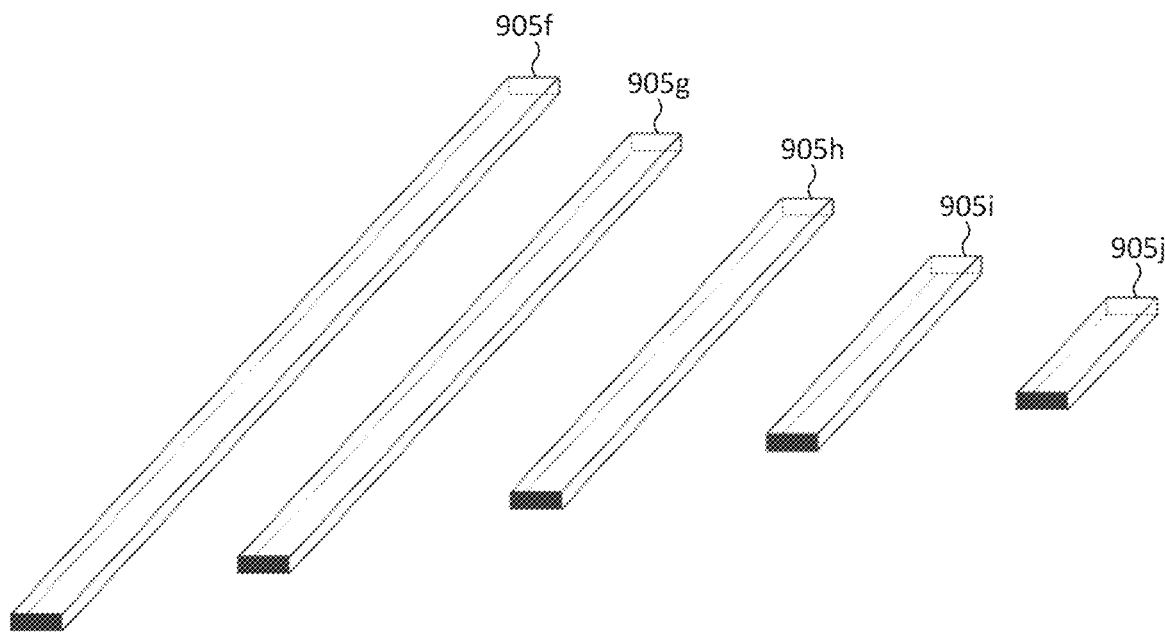

FIGS. 9A and 9B illustrate a plurality of electromagnetic strips according to various embodiments of the present disclosure. The embodiments of the plurality of electromagnetic strips shown in FIGS. 9A and 9B are for illustration only and should not be construed as limiting. As described herein, the electromagnetic strips 905 illustrated in FIGS. 9A and 9B can be implemented in a UE, such as the UE 116, to align the horizontal polarization and vertical polarization of the UE 116 by correcting the horizontal polarization of a radiated beam while maintaining the vertical polarization.

FIG. 9A illustrates a plurality of electromagnetic strips 905a-905e. The plurality of electromagnetic strips 905 can be the same as the plurality of electromagnetic strips 605 and the plurality of electromagnetic strips 505. As shown in FIG. 9A, each of the plurality of electromagnetic strips 905a-905e are the same length.

FIG. 9B illustrates another embodiment of the plurality of electromagnetic strips 905. As shown in FIG. 9B, the plurality of electromagnetic strips 905f-905j are arranged with gradually decreasing lengths. In other words, each of the plurality of electromagnetic strips 905f-905j is shorter than the one preceding it. More specifically, electromagnetic strip 905g has a length less than the length of electromagnetic strip 905f. Electromagnetic strip 905h has a length less than the length of electromagnetic strip 905g. Electromagnetic strip 905i has a length less than the length of electromagnetic strip 905h. Electromagnetic strip 905j has a length less than the length of electromagnetic strip 905i.

Figure 10:
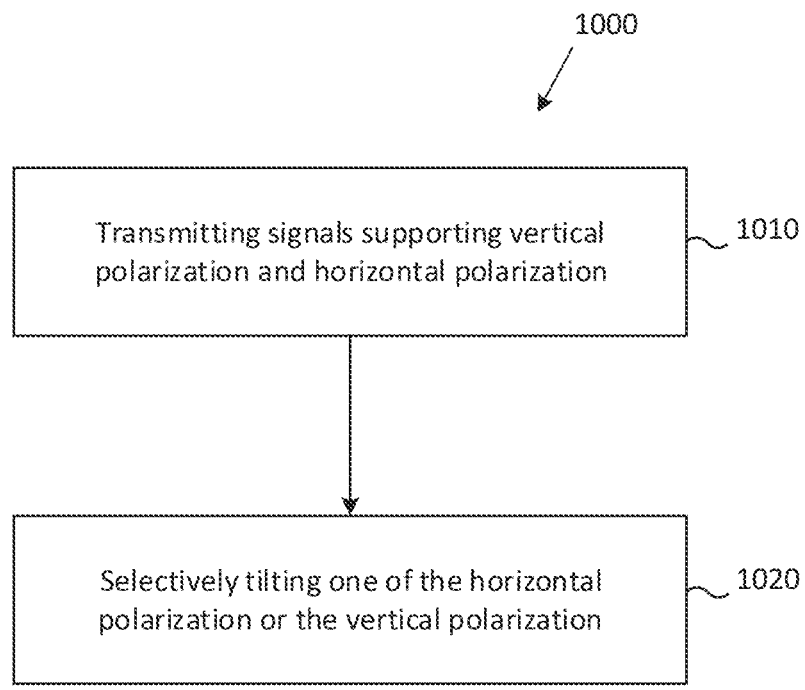
FIG. 10 illustrates a method of selectively tilting polarization according to various embodiments of the present disclosure.

FIG. 10 illustrates a method of selectively tilting polarization according to various embodiments of the present disclosure. Although described herein as being implemented by the UE 116, the method 1000 illustrated in FIG. 10 can be implemented by one or more of the UEs 111-116 and a corresponding method can be performed by one or more of the gNBs 101-103 described in FIG. 1. Other embodiments can be used without departing from the scope of the present disclosure.

In operation 1010, a UE, such as the UE 116, transmits signals supporting vertical polarization and horizontal polarization. The UE 116 can include a front surface including a display 265 and a rear surface including a cover 270. The signals can be transmitted by a transceiver 210 that is provided between the cover 270 and the display 265.

In operation 1020, the UE 116 selectively tilts one of the horizontal polarization or the vertical polarization. The UE 116 can selectively tilt one of the horizontal polarization or the vertical polarization by a plurality of electromagnetic strips, such as the electromagnetic strips 505. The electromagnetic strips can be proximate to the cover 270.

In some embodiments, a user equipment (UE) includes a front surface, a rear surface, a transceiver, and a plurality of electromagnetic strips. The front surface includes a display and the rear surface includes a cover. The transceiver is between the display and the cover and is configured to transmit signals supporting vertical polarization and horizontal polarization. The plurality of electromagnetic strips are proximate to the cover and oriented to selectively tilt one of the horizontal polarization or the vertical polarization of the signals.

In some embodiments, the plurality of electromagnetic strips are at least substantially parallel to each other and oriented to selectively tilt radiation from the transceiver having one of the horizontal polarization or the vertical polarization. In some embodiments, the plurality of electromagnetic strips are positioned between the transceiver and the cover. In some embodiments, the plurality of electromagnetic strips are embedded in the cover.

In some embodiments, each of the plurality of electromagnetic strips includes at least one of a meandering portion or a zig-zag portion. In some embodiments, each of the plurality of electromagnetic strips includes a curved portion corresponding to a curvature of the cover. In some embodiments, at least one of the plurality of electromagnetic strips is connected to another one of the plurality of electromagnetic strips.

In some embodiments, the UE further includes a plurality of switches provided on each of the plurality of electromagnetic strips, respectively, where the plurality of switches are configured to extend a range of the transceiver. In some embodiments, each of the plurality of electromagnetic strips include a uniform length. In some embodiments, a length of each of the plurality of electromagnetic strips progressively decreases from a first electromagnetic strip to a last electromagnetic strip.

Some embodiments of the present disclosure include a method of operating a UE. The method includes transmitting, by a transceiver, signals supporting vertical polarization and horizontal polarization and selectively tilting, by a plurality of electromagnetic strips, one of the horizontal polarization or the vertical polarization of the signals. The UE comprises a front surface including a display and a rear surface including a cover. The transceiver is provided between the cover and the display. The plurality of electromagnetic strips are proximate to the cover.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:

1. A user equipment (UE) comprising:
   a front surface including a display;
   a rear surface including a cover;
   a transceiver disposed between the cover and the display, the transceiver configured to transmit signals supporting vertical polarization and horizontal polarization; and
   a plurality of electromagnetic strips proximate to the cover, the plurality of electromagnetic strips oriented to selectively tilt one of the horizontal polarization or the vertical polarization of the signals, wherein at least two of the plurality of electromagnetic strips are separated from each other by a space having a width of at least one of the plurality of electromagnetic strips.

2. The UE of claim 1, wherein the plurality of electromagnetic strips are at least substantially parallel to each other and oriented to selectively tilt radiation from the transceiver having one of the horizontal polarization or the vertical polarization.

3. The UE of claim 1, wherein the plurality of electromagnetic strips are positioned between the transceiver and the cover.

4. The UE of claim 1, wherein the plurality of electromagnetic strips are embedded in the cover.

5. The UE of claim 1, wherein each of the plurality of electromagnetic strips includes at least one of a meandering portion or a zig-zag portion.

6. The UE of claim 1, wherein each of the plurality of electromagnetic strips includes a curved portion corresponding to a curvature of the cover.

7. The UE of claim 1, wherein at least one of the plurality of electromagnetic strips is connected to another one of the plurality of electromagnetic strips.

8. The UE of claim 1, further comprising a plurality of switches provided on each of the plurality of electromagnetic strips, respectively, the plurality of switches configured to extend a range of the transceiver.

9. The UE of claim 1, wherein each of the plurality of electromagnetic strips include a uniform length.

10. The UE of claim 1, wherein a length of each of the plurality of electromagnetic strips progressively decreases from a first electromagnetic strip to a last electromagnetic strip.

11. A method of operating a user equipment (UE), the method comprising:
    transmitting, by a transceiver of the UE, signals supporting vertical polarization and horizontal polarization through a plurality of electromagnetic strips positioned proximate to a cover of the UE, the plurality of electromagnetic strips oriented to selectively tilt one of the horizontal polarization or the vertical polarization of the signals,
    wherein at least two of the plurality of electromagnetic strips are separated from each other by a space having a width of at least one of the plurality of electromagnetic strips, and
    wherein the UE comprises a front surface including a display and a rear surface including the cover and the transceiver is provided between the cover and the display.

12. The method of claim 11, wherein the plurality of electromagnetic strips are at least substantially parallel to each other and oriented to selectively tilt radiation from the transceiver having one of the horizontal polarization or the vertical polarization.

13. The method of claim 11, wherein the plurality of electromagnetic strips are positioned between the transceiver and the cover.

14. The method of claim 11, wherein the plurality of electromagnetic strips are embedded in the cover.

15. The method of claim 11, each of the plurality of electromagnetic strips includes at least one of a meandering portion or a zig-zag portion.

16. The method of claim 11, wherein each of the plurality of electromagnetic strips includes a curved portion corresponding to a curvature of the cover.

17. The method of claim 11, wherein at least one of the plurality of electromagnetic strips is connected to another one of the plurality of electromagnetic strips.

18. The method of claim 11, wherein the UE includes comprising a plurality of switches provided on each of the plurality of electromagnetic strips, respectively, the plurality of switches configured to extend a range of the transceiver.

19. The method of claim 11, wherein each of the plurality of electromagnetic strips include a uniform length.

20. The method of claim 11, wherein a length of each of the plurality of electromagnetic strips progressively decreases from a first electromagnetic strip to a last electromagnetic strip.

* * * * *